US011935693B2

(12) United States Patent
Harrison

(10) Patent No.: US 11,935,693 B2
(45) Date of Patent: Mar. 19, 2024

(54) TRANSFORMER HELIX WINDING PRODUCTION

(71) Applicant: Enphase Energy, Inc., Petaluma, CA (US)

(72) Inventor: Michael J. Harrison, Petaluma, CA (US)

(73) Assignee: Enphase Energy, Inc., Petaluma, CA (US)

( * ) Notice: Subject to any disclaimer, the term of this patent is extended or adjusted under 35 U.S.C. 154(b) by 0 days.

(21) Appl. No.: 18/119,979

(22) Filed: Mar. 10, 2023

(65) Prior Publication Data

US 2023/0215626 A1 Jul. 6, 2023

Related U.S. Application Data

(62) Division of application No. 17/466,452, filed on Sep. 3, 2021, now Pat. No. 11,657,963.

(60) Provisional application No. 63/078,893, filed on Sep. 15, 2020.

(51) Int. Cl.

| | |
|---|---|
| ***C25D 17/00*** | (2006.01) |
| ***C25D 1/00*** | (2006.01) |
| ***C25D 3/40*** | (2006.01) |
| ***C25D 7/06*** | (2006.01) |
| ***H01F 41/098*** | (2016.01) |

(52) U.S. Cl.

CPC ........... *H01F 41/098* (2016.01); *C25D 1/003* (2013.01); *C25D 3/40* (2013.01); *C25D 7/0614* (2013.01); *C25D 17/00* (2013.01)

(58) Field of Classification Search

None

See application file for complete search history.

(56) References Cited

U.S. PATENT DOCUMENTS

| | | | | |
|---|---|---|---|---|
| 2,897,397 | A | 7/1959 | Wiley | |
| 3,444,615 | A | 5/1969 | Anderson et al. | |
| 3,939,046 | A * | 2/1976 | Conn | C25D 1/00 205/67 |
| 4,527,141 | A | 7/1985 | Post | |
| 5,512,224 | A | 4/1996 | Medney et al. | |
| 6,132,887 | A | 10/2000 | Clouser et al. | |
| 6,667,536 | B2 | 12/2003 | Chaudhry et al. | |
| 2006/0085976 | A1 | 4/2006 | Eldridge et al. | |
| 2007/0279177 | A1 | 12/2007 | Sarver et al. | |
| 2011/0163833 | A1 | 7/2011 | Pulnikov | |
| 2019/0106798 | A1 * | 4/2019 | Verardo | G03F 7/0037 |
| 2020/0041582 | A1 | 2/2020 | Schulz et al. | |

FOREIGN PATENT DOCUMENTS

| | | | |
|---|---|---|---|
| DE | 4339641 | A1 | 4/1995 |
| TW | 202017231 | A | 5/2020 |
| WO | WO-2011/047177 | A2 | 4/2011 |

OTHER PUBLICATIONS

International Search report and Written Opinion for application No. PCT/US2021/049302 dated Dec. 23, 2021.

* cited by examiner

*Primary Examiner* — Stefanie S Wittenberg
(74) *Attorney, Agent, or Firm* — Moser Taboada

(57) ABSTRACT

Methods and apparatus for producing helix windings used for a transformer are provided. For example, apparatus comprise an electrically conductive mandrel comprising an elongated body, a head comprising an eyelet detail, and a winding structure disposed along the elongated body.

8 Claims, 2 Drawing Sheets

TRANSFORMER HELIX WINDING PRODUCTION

CROSS-REFERENCE TO RELATED APPLICATIONS

The present application is a divisional application of U.S. patent application Ser. No. 17/466,452, filed on Sep. 3, 2021, which claims the benefit of and priority to U.S. Provisional Application Ser. No. 63/078,893, filed Sep. 15, 2020, the entire contents of each of these applications is incorporated herein by reference.

BACKGROUND

Field

Embodiments of the present disclosure generally relate to transformer windings and, in particular, to methods and apparatus for manufacturing flat helix windings.

Description of the Related Art

Planar transformers make use of 'flat' winding structures as opposed to conventional round transformer wires. There are predominantly three different technologies currently used to produce the flat winding structures used in planar transformers: printed circuit board (PCB), foil windings, and helix windings.

The PCB winding structure has two main advantages: the PCB that is used to form the transformer windings can be the same PCB that is used to connect the other electronic components that connect to the transformer, and the windings can be made very thin which is good for high frequency operation (typical PCB copper thickness is 35 μm). The main disadvantage, however, with PCB windings is that it is challenging to manufacture multi-layer windings. Exotic PCB manufacturing methods that are capable of supporting 'blind vias' and 'buried vias' can be used to enable multi-layer windings; however, these exotic PCB processes are expensive and even with blind and buried vias there are still many design compromises in using this technology.

Foil winding structures have the advantage that the foil can be very thin, which is beneficial for high frequency operation; however, this winding structure has disadvantages in regard to the design challenge (design compromises and cost) to fabricate multi-layer windings.

The helix winding structure uses a 'rolling mill' process to create 'flat wire' that is helix wound. This structure has the advantage that it can be made with any number of winding turns, with each turn being on an adjacent layer. The main disadvantage with this winding structure is that the rolling mill process is not able to produce thin (and wide) windings. The thinnest flat wire that can be produced is around 200 μm thick and only 4 mm wide resulting in a width-to-thickness ratio (winding aspect ratio) of 20:1.

Therefore, there is a need for a method and apparatus for efficiently producing helix windings with very high width-to-thickness aspect ratio.

SUMMARY

In accordance with at least some embodiments of the present disclosure, there is provided an apparatus for producing helix windings used for a transformer comprising an electrically conductive mandrel comprising an elongated body, a head comprising an eyelet detail, and a winding structure disposed along the elongated body.

In accordance with at least some embodiments of the present disclosure, there is provided a system for producing helix windings used for a transformer comprising a power supply, a container holding an electrolyte solution, an anode connected to a positive terminal of the power supply, disposed in the container, and surrounded by the electrolyte solution, and an electrically conductive mandrel comprising an elongated body, a head comprising an eyelet detail connected to a negative terminal of the power supply, and a winding structure disposed along the elongated body.

In accordance with at least some embodiments of the present disclosure, there is provided a method for producing helix windings used for a transformer comprising submerging an electrically conductive mandrel into an electrolyte solution, rotating the electrically conductive mandrel in the electrolyte solution while supplying power to the electrically conductive mandrel from a power supply, and removing copper that has been electroplated to a winding structure of the electrically conductive mandrel.

BRIEF DESCRIPTION OF THE DRAWINGS

So that the manner in which the above recited features of the present disclosure can be understood in detail, a particular description of the disclosure, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

DETAILED DESCRIPTION

Embodiments of the present disclosure comprise methods and apparatus for producing single- or multi-turn, multi-layer helix windings that are both very thin (e.g., about 10 μm to about 100 μm) and wide with high winding aspect ratios (e.g., 1,000:1). In various embodiments, an electro-deposition (electro-plating) production process is employed to manufacture the helix windings using a mandrel comprising winding structures suitably sized and shaped to produce the desired windings. This process also benefits from being able to produce high purity copper windings, which is a desirable characteristic for transformer windings.

Figure 1:
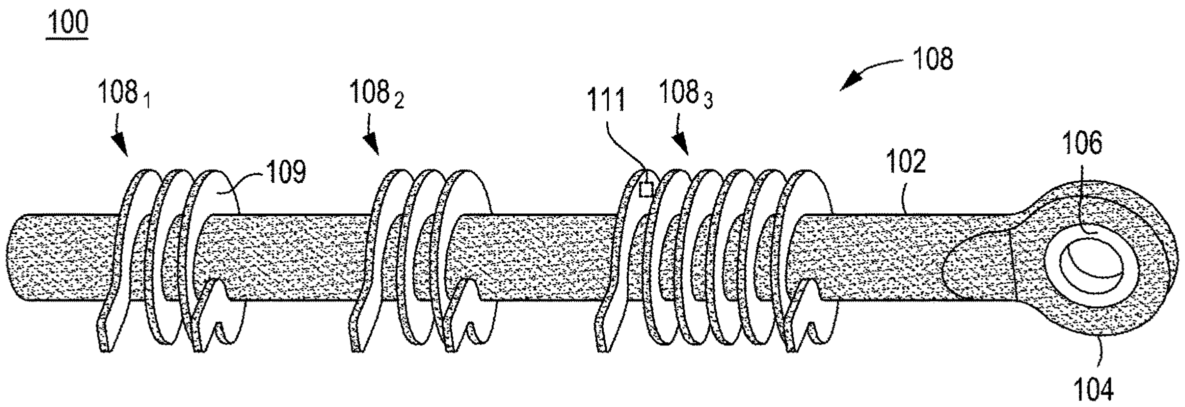
FIG. 1 is a side view of a mandrel for producing helix windings, in accordance with at least some embodiments of the present disclosure.

FIG. 1 is a side view of a mandrel 100 for producing helix windings in accordance with at least some embodiments of the present disclosure. The mandrel 100 (e.g., an electrically conductive mandrel) comprises a body 102 (e.g., an elongated body) extending from a head 104 that is positioned on one end of the mandrel 100. The head 104 has an eyelet detail 106 having one or more suitable shapes, e.g., circular, rectangular, oval, etc. For example, in the illustrated embodiment, the eyelet detail 106 is shown having a circular shape.

The body 102 is formed from one or more suitable metals. For example, in at least some embodiments, the body 102 is formed from titanium and is suitably sized and shaped based on a desired shape for the fabricated windings. For example, the body 102 can have a tubular, rectangular, oval, etc. shape that produces the desired winding shape. In the illustrated embodiment, the body 102 has an elongated configuration with a generally tubular shape. Alternatively, the body 102 can have a rectangular shape that may be used to produce rectangular-shaped helix windings. Alternatively, the body 102 can have a noncontinuous shape, e.g., a portion that is generally tubular and a portion that is rectangular. The mandrel 100 can be of any desired length based on the number and size (i.e., number of turns) of the windings to be fabricated.

Wrapped around the body 102 in helix shapes are one or more winding structures. For example, in at least some embodiments, two three-turn winding structures 108$_1$ and 108$_2$ and a six-turn winding structure 108$_3$ (collectively referred to as winding structures 108) can be wrapped around the body 102. The winding structures 108 may have any desired number of turns for the windings to be produced. The winding structures 108 may be part of the form factor of the mandrel 100, or they may be separately fabricated and adhered to the body 102.

In order to create the thin foil windings, the body 102 is placed into a suitable electrolyte solution for electro-deposition of high-purity copper (e.g., at least one of copper sulfate, copper cyanide, copper acetate, or the like) onto the winding structures 108. Those surfaces of the mandrel 100 that are not to be electroplated are insulated using an epoxy paint or similar insulating material, area shown shaded in FIG. 1. As shown in FIG. 1, the body 102 and the head 104 are covered in an insulating material, while the eyelet detail 106 along with a top surface 109 and a bottom surface 111 (shown in phantom in FIG. 1) of the winding structures 108 are not. In the illustrated embodiment, the two three-turn winding structures 108$_1$ and 108$_2$ each have three top surfaces 109 and three bottom surfaces 111, and the six-turn winding structure 108$_3$ has have six top surfaces 109 and six bottom surfaces 111.

Although the mandrel 100 conducts electricity and, therefore, can be electroplated, titanium is a highly incompatible base metal for electroplating copper (in some embodiments, base metals other than titanium that are highly incompatible for electroplating copper may also be used. As such, the electroplated copper is not inseparably adhered to the exposed surfaces (e.g., the top surface 109 and the bottom surface 111) of the mandrel 100 and the deposited thin copper foil can be easily peeled from the exposed surfaces of the winding structures 108 to produce the desired windings. Each of the winding structures 108 will produce two identical helix windings—one that is electroplated to the top surface 109 of the winding structures 108 and the other to the bottom surface 111 of the winding structures 108.

In various embodiments, the eyelet detail 106 may be used to suspend the mandrel 100 in an electrolyte solution during an electro-deposition process and also facilitates a connection to the negative terminal of an electroplating power supply. The deposition process may be a batch process where multiple mandrels 100 are simultaneously emerged in the electrolyte solution. For example in some embodiments, a few hundred mandrels (or more) may be processed at the same time.

Figure 2:
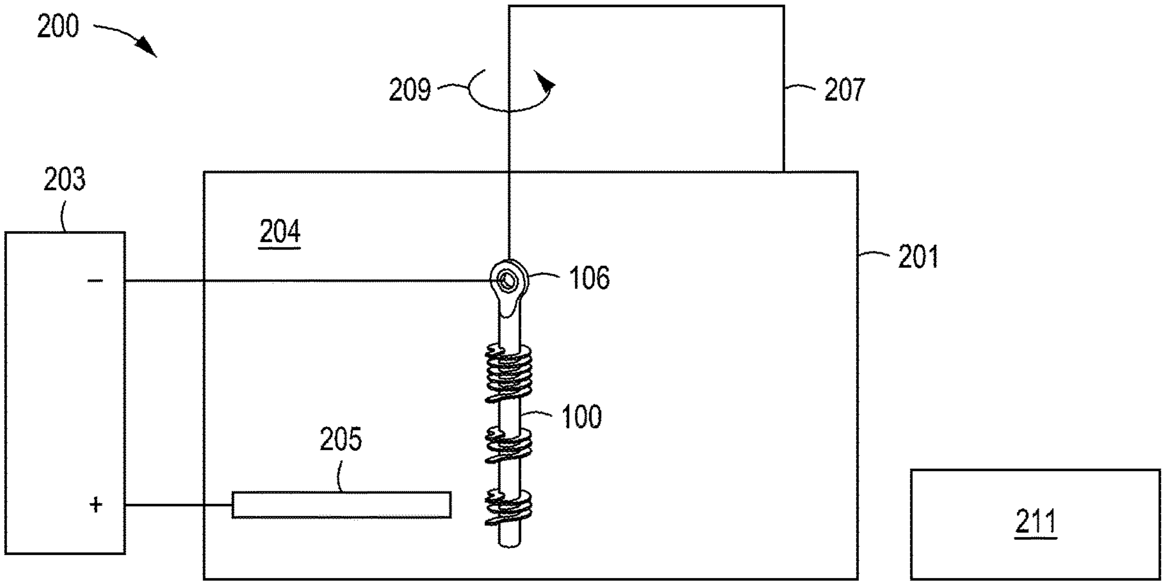
FIG. 2 is a diagram of a system that uses the mandrel of FIG. 1 for producing helix windings, in accordance with at least some embodiments of the present disclosure.
Figure 3:
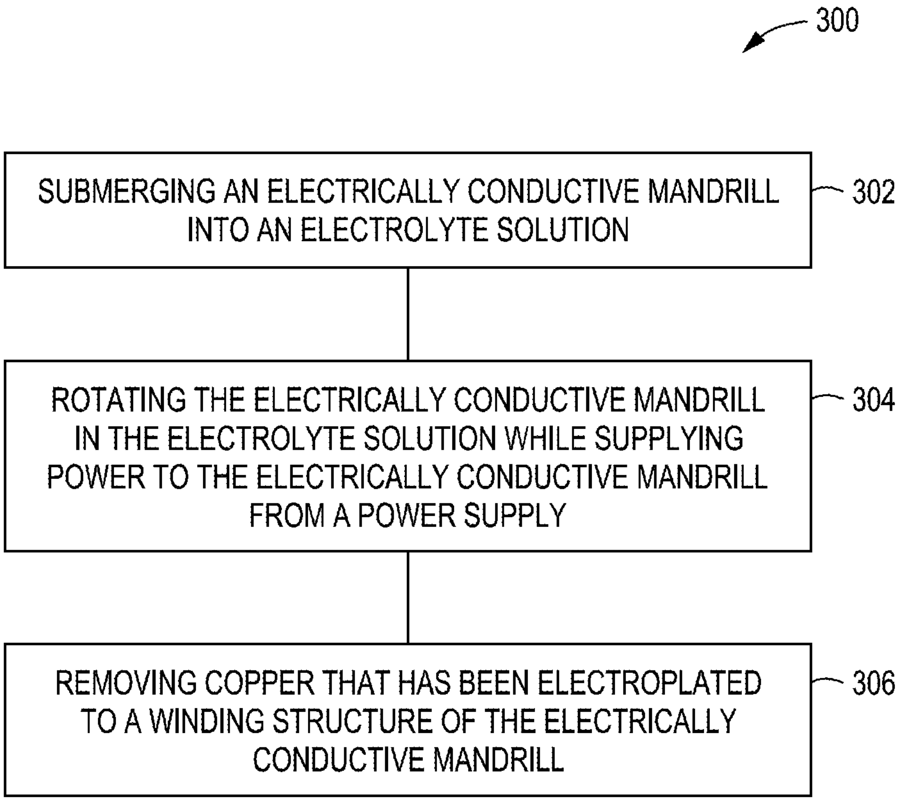
FIG. 3 is a flowchart of a method that uses the system of FIG. 2 for producing helix windings, in accordance with at least some embodiments of the present disclosure.

FIG. 2 is a diagram of a system 200 that uses the mandrel 100 of FIG. 1 for producing helix windings, and FIG. 3 is a flowchart of a method 300 for producing helix windings, in accordance with at least some embodiments of the present disclosure.

For example, at 302, the method 300 comprises submerging an electrically conductive mandrel (e.g., the mandrel 100) into a container 201 holding an electrolyte solution 204. For example, in at least some embodiments, a transfer device 207 can be configured to submerge the mandrel 100 into the electrolyte solution 204. In at least some embodiments, the transfer device 207 can be coupled to a top surface of the container 201, and a cable 209 (or other suitable device) of the transfer device 207 can attach to the eyelet detail 106 of the mandrel 100.

In at least some embodiments, the deposition processing generally includes a mechanism for agitating the electrolyte solution 204 (e.g., at least one copper sulfate, copper cyanide, and/or copper acetate) in which the mandrel 100 (or mandrels) can be submerged, such as a pumping action in the electrolyte solution, a stirring action in the electrolyte solution, rotating the mandrel 100 in the electrolyte solution, dipping the mandrel 100 in the electrolyte solution, and the like. For example, next, at 304, the method 300 comprises rotating the electrically conductive mandrel in the electrolyte solution while supplying power to the electrically conductive mandrel from a power supply. For example, the mandrel 100 can be rotated using one or more suitable rotation devices (e.g., one or more of a spinner, motor, axle, bearings, gears, wheels, etc.) coupled to the cable 209. For example, in at least some embodiments, the transfer device 207 can include a motor (not shown) that is connected to the cable 209 which rotates the mandrel 100 once the mandrel 100 has been submerged in the electrolyte solution 204. While the mandrel 100 is being rotated, a power supply 203 can be configured to provide power to the mandrel 100 to facilitate the electroplating procedure. For example, in at least some embodiments, the eyelet detail 106 of the mandrel 100 can be connected to a negative terminal of the power supply 203 and an anode 205 that is disposed in the container can be connected to the positive terminal of the power supply 203, thus forming an electrical circuit that can be used for the electro-deposition of high-purity copper onto the top surface 109 and the bottom surface 111 of the winding structures 108. In at least some embodiments, the power supply 203 can supply about 0.5 volts to about 6 volts. In at least some embodiments, the power supply 203 can be configured to provide power to the mandrel 100 prior to or after the mandrel 100 has been rotated.

A thickness of electro-deposited copper 206 can be determined by controlling a length of time the mandrel 100 is electroplated—the longer the electroplating time, the greater a copper thickness. For example, in at least some embodiments, the time the mandrel 100 is electroplated can be calculated to provide a thickness of about 10 μm to about 100 μm.

Next, in at least some embodiments, at 306, the method 300 comprises removing copper that has been electroplated to a winding structure of the electrically conductive mandrel. For example, once a desired thickness of copper has been electro-deposited, the mandrel 100 can be removed from the electrolyte solution and, in at least some embodiments, prior to removing copper that has been electroplated to the winding structure (e.g., electro-deposited copper helix windings), the method 300 comprises removing residual electrolyte from the winding structures 108 of the mandrel 100. For example, the mandrel 100 may be washed (e.g., in water) or etched to remove any residue electrolyte. Thereafter, the electro-deposited copper helix windings can simply be peeled/scrapped from the winding structures 108 and the mandrel 100 can be reused to fabricate additional windings. For example, in at least some embodiments, the transfer device 207 can be configured to transfer the mandrel 107 to a removal device 211. In at least some embodiments, the removal device 211 can comprise a sharp blade which can be in the form of a knife or chisel (e.g., disposed on a peeling/scrapping wheel or other suitable device) that is configured to remove the electro-deposited copper helix windings from the top surface 109 and the bottom surface 111 of the winding structures 108. The removal device 211 can be a component of the system 200 or a stand-alone component configured to operate in conjunction with the system 200.

In accordance with the disclosed herein methods, high purity copper helix windings that are both very thin (e.g., on the order of 10 μm-100 μm) and wide with high winding aspect ratios (e.g., 1,000:1) can be produced in relatively quick and cost-efficient manner.

In various embodiments, the fabricated windings may be further processed to provide an insulation layer over the copper, for example using established industry processes.

In one or more alternative embodiments, the techniques described herein may be used to produce 3-D copper parts for other applications. For example, the utility of the methods described herein can be based on the ability to make parts with extreme aspect ratios (e.g., very thin while being very wide/long), compound curved surfaces (e.g., non-developable surfaces), complex 2-D surfaces containing overlapping surfaces, and other electroplated parts in a shape that allows the electroplated parts to be peeled of a mandrel described herein.

While the foregoing is directed to embodiments of the present disclosure, other and further embodiments of the disclosure may be devised without departing from the basic scope thereof.

What is claimed is:

1. A system for producing helix windings used for a transformer, comprising:

a power supply;

a container holding an electrolyte solution;

an anode connected to a positive terminal of the power supply, disposed in the container, and surrounded by the electrolyte solution; and an electrically conductive mandrel comprising:

an elongated body;

a head comprising an eyelet detail connected to a negative terminal of the power supply; and a winding structure disposed along the elongated body, wherein the elongated body, the head, and a portion of the winding structure that is not to be electroplated are covered in an insulating material, and wherein the eyelet detail is not covered in the insulating material.

2. The system of claim 1, wherein the insulating material is an epoxy paint.

3. The system of claim 1, wherein the portion of the winding structure that is to be electroplated comprises a top surface and a bottom surface of the winding structure.

4. The system of claim 1, wherein the electrically conductive mandrel is formed from titanium.

5. The system of claim 1, wherein the winding structure comprises two three-turn winding structures and a six-turn winding structure.

6. The system of claim 1, wherein the winding structure comprises a top surface and a bottom surface configured to be electroplated when the electrically conductive mandrel is disposed in the electrolyte solution for electro-deposition of high-purity copper.

7. The system of claim 1, wherein the electrolyte solution comprises at least one of copper sulfate, copper cyanide, of copper acetate.

8. The system of claim 1, further comprising a removal device that is configured to remove copper that has been electroplated to the winding structure.

* * * * *